United States Patent

[11] 3,633,821

| [72] | Inventor | Levi J. F. Austin<br>Atherstone, England |
|---|---|---|
| [21] | Appl. No. | 7,047 |
| [22] | Filed | Jan. 30, 1970 |
| [45] | Patented | Jan. 11, 1972 |
| [73] | Assignee | Clear Hooters Limited<br>Bedworth, Nuneaton, Warwickshire,<br>England |

[54] FLUID-PRESSURE CONTROL VALVES
3 Claims, 1 Drawing Fig.

[52] U.S. Cl. .................................................. 236/87,
236/92
[51] Int. Cl. .................................................. G05d 23/185
[50] Field of Search ............................................ 236/86, 87,
101

[56] References Cited
UNITED STATES PATENTS

| 1,872,433 | 8/1932 | Evans ........................... | 236/101 |
| 2,166,384 | 7/1939 | West ............................ | 236/101 UX |
| 2,310,594 | 2/1943 | Osburn ......................... | 123/180 |
| 2,868,459 | 1/1959 | Modes .......................... | 236/87 |

*Primary Examiner*—Edward J. Michael
*Attorney*—Scrivener Parker Scrivener and Clarke

ABSTRACT: A valve for modulating the vacuum supply to a servosystem is manually set by adjusting a spring supporting a diaphragm against atmospheric pressure and the setting of the valve is varied in accordance with the ambient temperature by a bimetallic strip.

PATENTED JAN 11 1972    3,633,821
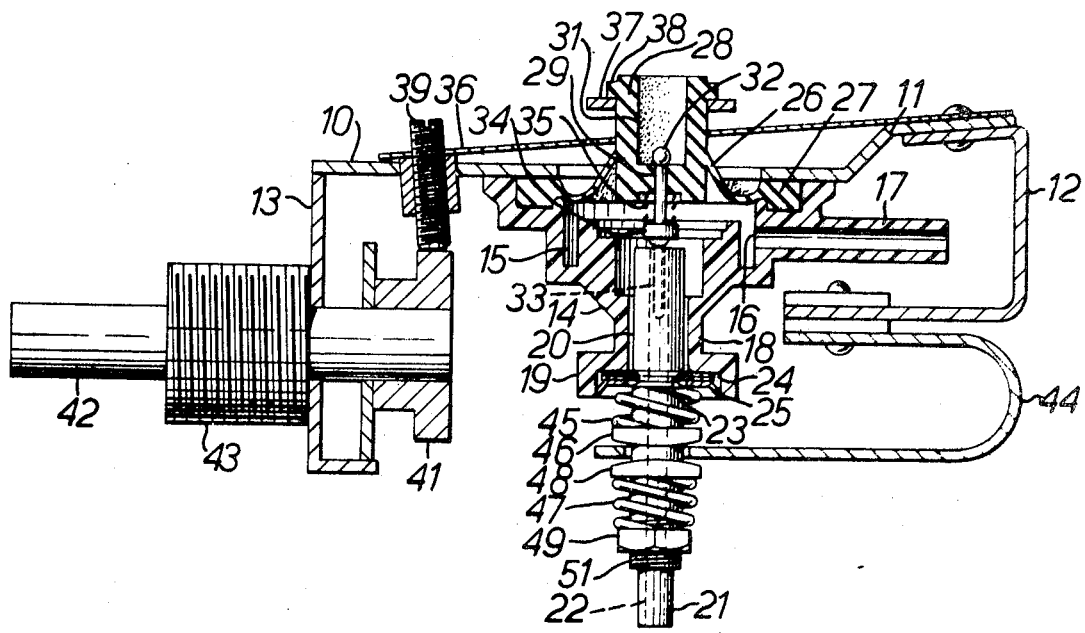

FLUID-PRESSURE CONTROL VALVES

This invention relates to improvements in valves for use in servosystems in which a source of vacuum or low pressure is used to provide the power for causing mechanical movements through the medium of fluid pressure motors such as piston and cylinder assemblies or flexible diaphragms.

Where the servosystem is used on a vehicle the vacuum source is usually the manifold of the engine and control is provided by a manually operated vacuum-modulating valve.

Our invention is concerned with a vacuum-modulating valve of the kind in which a valve body incorporates inlet and outlet connections, a diaphragm exposed on one side to atmosphere and on the other side to the vacuum in the outlet chamber, and a valve member controlling the inlet and a passage through the diaphragm in accordance with the position of the diaphragm which is supported against atmospheric pressure by a spring of which the loading can be adjusted by a manually operated cam.

In the specification of our British Pat. No. 1,167,921 we have described a modification of that valve in which a temperature-sensitive element such as a bimetallic strip is connected to the diaphragm of the valve and is operative to adjust the setting of the diaphragm in response to the ambient temperature to which the element is exposed, whereby for a given manual setting of the cam the pressure in the outlet chamber of the valve is varied in accordance with the ambient temperature.

According to our present invention, in a valve of the kind set forth the valve member controls the inlet by cooperating with the inner end of a bore in a plunger or piston which is axially movable in the body and the outer end of which projects from the body and is adapted to be engaged by a bimetallic strip.

One advantage of this modification is that the bimetallic strip only has to cope with the vacuum acting on the inner end of the plunger instead of the considerable force of the vacuum acting on the diaphragm.

This allows the use of a thinner and shorter bimetallic strip which responds more quickly to variations in temperature.

A vacuum-modulating valve incorporating our invention is illustrated by way of example in the accompanying drawing which is a sectional view of the valve.

In the valve illustrated the frame or mounting 10 of the valve is a sheet metal pressing having a flat mounting surface and an upwardly joggled part 11 at one end. A channel section bracket 12 is secured to the underside of the joggled part 11 of the frame 10, the open side of the channel facing inwardly. A downwardly projecting bracket 13 is secured to the other end of the mounting 10.

The valve body 14 is a plastics moulding of the form shown in the drawing and its open upper end is secured against the underside of the frame 10. Within the body there is an outlet chamber 15 having in its peripheral wall an opening 16 leading to an outlet tube 17 adapted to be connected to the fluid pressure motor to be controlled. A boss 18 on the lower end of the body 14 is provided with a downwardly facing cup 19, and an axial passage 20 through the cup and the boss leads to the outlet chamber 15. A plunger 21, having an axial bore 22, is a clearance fit in the passage 20 and is provided with an annular groove 23 which is adapted to engage with a flexible sealing element 24 that is held against the base of the cup 19 by a clip 25. The axial bore 22 of the plunger 21 is adapted to be connected to a source of vacuum and is thus the inlet to the valve.

The upper end of the body is closed by a rubber diaphragm 26 exposed on its underside to the pressure in the outlet chamber 15. A thickened peripheral lip 27 on the diaphragm is clamped between the frame 10 and an annular shoulder in the body 14.

A central boss 28 on the diaphragm extends upwardly through an opening of substantial diameter in the frame. An axial passage 29 of small diameter in the lower end of the boss 28 leads into an axial recess 31 of greater diameter in the upper end of the boss 28. The lower end of the recess 31 provides a seat for a ball 32 on the upper end of a valve pin 33 which extends downwardly through the passage 29 and into the axial bore 22 of the plunger 21. Above the plunger 21 the pin 33 carries a coned collar 34 which seats in the upper end of the bore 22. The valve pin 33 is loaded by a light spring 35 urging it downwardly.

The upper end of the boss 28 on the diaphragm passes through a hole in a flat blade spring 36 of which one end is secured to the joggled part 11 of the frame 10. The boss 28 is axially located with respect to the blade spring 36 by a washer 37 which fits under a radially projecting flange 38 on the upper end of the boss 28. The washer 37 is provided with downwardly projecting tags (not shown) which space the flange 38 from the spring 36 and enable the spring and the boss to move upwardly and downwardly together.

Adjustably mounted in the free end of the blade spring 36 is a screw-threaded pin 39 of which the lower end bears on the control surface of a cam 41. The cam 41 is mounted on the inner end of a spindle 42 rotatably mounted in a bush 43 secured in the bracket 13.

When the cam is in the off position and the free end of the spring 36 is in its lowermost position the diaphragm lies in such a position that the collar 34 on the valve pin is seated by the spring 35 against the upper end of the bore 22 and cuts off the outlet chamber 15 in the valve body from the inlet connected to vacuum. The ball 32 on the upper end of the valve pin is clear of the upper end of the passage 29 in the diaphragm and the outlet chamber is at atmospheric pressure.

Upon rotation of the cam the free end of the spring 36 is raised and the spring raises the diaphragm until the ball 32 seats on the lower end of the recess 31 and closes the passage 29. At the same time the collar 34 on the valve pin is withdrawn from the upper end of the bore 22 so that vacuum is applied to the outlet chamber 15. The vacuum creates a pressure differential across the diaphragm 26 which moves downwardly under the atmospheric pressure on its upper side and against the resistance of the spring 36 which acts to counter the pressure differential. An equilibrium position is reached when the vacuum existing in the outlet chamber is balanced by the loading applied to the diaphragm by the spring 36. The spring loading can be varied by angular adjustment of the cam 41 and the vacuum existing in the outlet chamber 15 and applied to the fluid pressure motor to be controlled can be set within close limits over a wide range.

In order to make the valve sensitive to variations in ambient temperature a bimetallic strip 44 acts on the axially movable plunger 21. The bimetallic strip 44 is U-shaped, one limb of the U being secured to the underside of the channel section bracket 12 while the plunger 21 passes through in a hole in the other limb of the U. The bimetallic strip 44 is located on the plunger 21 by a spring 45 acting between the cup 19 on the body of the valve and a washer 46 bearing on the strip. A second spring 47 acts between a washer 48 bearing on the underside of the strip and a nut 49 screwed onto a threaded portion 51 of the plunger 21. Thus the position of the free limb of the bimetallic strip on the plunger can be adjusted by the setting of the nut 49. The point of engagement of the strip on the plunger controls the loading of the strip on the plunger and hence the position of the plunger in relation to the collar 34.

The bimetallic strip 44 is arranged so that an increase in ambient temperature causes the lower limb of the U to flex upwardly; thus allowing the plunger 21 to move upwardly. This movement brings the upper end of bore 22 or vacuum inlet into contact with the collar 34, reducing the degree of vacuum in the outlet chamber 15 necessary to maintain equilibrium for a given setting of the cam 41. Conversely upon a decrease in ambient temperature the degree of vacuum in the outlet chamber required to maintain equilibrium is correspondingly increased.

A valve of the kind described above is suitable for controlling flaps or other movable devices in a vehicle heating system. Without the bimetallic strip, a given setting of the control cam will ensure a constant heat output from the heater but, if the ambient temperature changes, the user will have to adjust the cam in order to maintain his surroundings at a constant temperature. With the bimetallic strip the control cam can be graduated in terms of temperature and the output of the heater will vary automatically with changes in the ambient temperature.

I claim:

1. A vacuum-modulating valve which comprises a body, an open-ended chamber within the body, an outlet from the chamber adapted to be connected to a servomotor, an inlet to the chamber adapted to be connected to a source of vacuum, a diaphragm across the open end of the chamber exposed on one side to the vacuum in the chamber and on the other side to atmosphere, a passage through the diaphragm, a valve member controlling the inlet and the passage through the diaphragm, a spring which supports the diaphragm against atmospheric pressure and a manually operated cam which controls the loading of the spring, said inlet comprising an axial bore in a tubular plunger sealingly extending through the body of the valve and being constructed and arranged to be axially movable relative to the body and the diaphragm, the outer end of the plunger projecting from the body with the outer end of said bore being adapted to be connected to said vacuum source, the inner end of the plunger bore cooperating with the valve member, and a bimetallic strip engaging the outer end of said plunger whereby the position of the inner end of said plunger bore relative to the valve member is adjusted by the bimetallic strip in accordance with the ambient temperature.

2. A vacuum-modulating valve as in claim 1 in which the plunger works in an axial passage in the body of the valve through a flexible sealing element engaged with the plunger and the body of the valve.

3. A vacuum-modulating valve as in claim 1 in which the point of engagement of the bimetallic strip on the plunger is axially adjustable through resilient means.

* * * * *